United States Patent [19]

Fan et al.

[11] Patent Number: 4,556,277

[45] Date of Patent: * Dec. 3, 1985

[54] TRANSPARENT HEAT-MIRROR

[75] Inventors: John C. C. Fan, Chestnut Hill; Frank J. Bachner, Newton, both of Mass.

[73] Assignee: Massachusetts Institute of Technology, Cambridge, Mass.

[ * ] Notice: The portion of the term of this patent subsequent to Jul. 6, 1999 has been disclaimed.

[21] Appl. No.: 365,533

[22] Filed: Apr. 5, 1982

Related U.S. Application Data

[63] Continuation of Ser. No. 690,696, May 27, 1976, Pat. No. 4,337,990, which is a continuation-in-part of Ser. No. 498,160, Aug. 16, 1974, abandoned.

[51] Int. Cl.⁴ .............................................. G02B 5/28
[52] U.S. Cl. ...................................... 350/1.7; 350/166
[58] Field of Search ................. 350/1.1, 1.6, 1.7, 164, 350/166; 250/510, 505.1; 126/417

[56] References Cited

U.S. PATENT DOCUMENTS

| | | | |
|---|---|---|---|
| 2,854,349 | 9/1958 | Dreyfus et al. | 350/1.7 |
| 3,272,986 | 9/1966 | Schmidt | 350/1.7 X |
| 3,682,528 | 8/1972 | Apfel et al. | 350/1.7 |
| 3,698,946 | 10/1972 | Kaspaul et al. | 428/432 |
| 3,781,077 | 12/1973 | Groth | 350/1.7 |
| 3,889,026 | 6/1975 | Groth | 350/1.7 X |
| 3,901,997 | 8/1975 | Groth | 350/1.7 X |
| 3,962,488 | 6/1976 | Gillery | 427/109 |
| 4,017,661 | 4/1977 | Gillery | 428/412 |
| 4,337,990 | 7/1982 | Fan et al. | 350/1.7 |

FOREIGN PATENT DOCUMENTS

| | | | |
|---|---|---|---|
| 47-6633 | 2/1972 | Japan | 204/192 P |
| 0006315 | 2/1972 | Japan | . |

OTHER PUBLICATIONS

Groth et al., "Thermal Insulation of Sodium Lamps," *Philips Technical Review*, vol. 26, No. 4, Jun. 1965, pp. 105–111.

*Primary Examiner*—John Lee
*Attorney, Agent, or Firm*—Arthur A. Smith, Jr.; David E. Brook

[57] ABSTRACT

Transparent heat-mirrors are disclosed which are comprised of composite films. These films include a discrete and continuous layer of metallic silver sandwiched between a transparent, outer, protective, anti-reflection layer and a transparent, phase-matching layer. This combination of layers is chosen to provide high solar transmission with minimum loss of thermal radiation. Transparent heat-mirrors are useful in the collection and trapping of solar energy, and in other applications where it is desired or necessary to have high infrared reflectivity with high solar transmission.

3 Claims, 4 Drawing Figures

TRANSPARENT HEAT-MIRROR

GOVERNMENT SUPPORT

The invention described herein was made in the course of or under a contract from the U.S. Air Force.

RELATED APPLICATION

This application is a continuation of Ser. No. 690,696, filed May 27, 1976, now U.S. Pat. No. 4,337,990, which is a continuation-in-part of U.S. Ser. No. 498,160, filed Aug. 16, 1974, now abandoned.

BACKGROUND OF THE INVENTION

1. Field of the Invention

The invention is in the field of heat-mirrors and more particularly in the field of heat-mirrors having high infrared reflectivity and high visible transmission.

2. Description of the Prior Art

Heat-mirrors that reflect radiation in the infrared spectrum while transmitting radiation in the visible spectrum have important applications as transparent thermal insulators for furnaces, windows in buildings, and solar-energy collection. In the field of solar energy, for example, it is desirable to collect sunlight efficiently and to convert it into heat energy. Traditional strategy for optimizing thermal energy collection with a flat-plate collector has been concentrated on the absorber wherein the sun's radiant energy is converted into heat. If the absorber is a black body, it converts all of the incident radiation into heat, but it also converts the heat to infrared radiation that is reradiated back into space. Usual strategy is to design a material that has high absorptivity for radiation from the sun, but that has low emissivity for infrared radiation. For solar energy farms to collect solar energy for thermal to electrical power conversion, this requires a material that has a low emissivity for infrared radiation from a body at about 800° K. Moreover, the absorber material possessing these properties must be stable at such temperatures for long periods of time, must withstand thermal variations from cold winter nights to 800° K. during the day; and must also be cheap to manufacture and to maintain in the field. The probability of success with this strategy alone appears minimal.

An alternate strategy is to introduce a heat-mirror that is separated from the heat absorber and will therefore be much cooler. Heat-mirrors designed for this purpose have been fabricated from tin-doped indium oxide and antimony-doped tin oxide. See Groth, R. and Kauer, E., *Philips Tech. Rev.*, 26, 105 (1965); Groth, R., *Phys. Stat. Solid*, 14, 69 (1966); Fraser, D. B. and Cook, H. D., *J. Electrochem. Soc.*, 119, 1368 (1972); Vossen, J. L. and Poliniak, E. S., *Thin Solid Films*, 13, 281 (1972); Mehta, R. R. and Vogel, S. F., *J. Electrochem. Soc.*, 119, 752 (1972); and Vossen, J. L., *RCA Review*, 32, 289 (1971). Although these materials are stable in air up to 400°–500° C. and can have visible transmissions as high as 80–90% on Pyrex glass, their infrared reflectivities at around 10 micrometers (for room temperature radiation) are only between about 80–90%, which are much lower than desirable.

Kirchoff's Law states that the sum of transmission (Tr), reflectivity (R) and absorptivity (A) for a given wavelength must be equal to one, or $Tr+R+A=1.0$. For transparent heat-mirrors, solar transmission must be high, and hence the reflectivity and absorptivity must be low. In the infrared, however, the heat-mirror must have high reflectivity and so transmission and absorptivity in the infrared must be low. Using Kirchoff's Law, and assuming that transmission in the infrared is minimal, it can be shown that thermal radiation losses are directly proportional to $(1-R)$, meaning that it is important to have an infrared reflectivity as close to 100% as possible while maintaining the solar transmission as high as possible.

Other heat-mirrors are also known. See Holland, L. and Siddall, G., *British Journal of Applied Physics*, 9, 359 (1958). These authors tested various metal oxide films on glass, gold films on glass, and gold films sandwiched between either bismuth oxide or silicon monoxide layers. They found that the optimum performance was obtained with multilayer composite having a 130 Å gold layer sandwiched between two 450 Å bismuth oxide coatings. Nevertheless, the transmittance of this composite was found to be only 73% for green light and the reflectance was only 74% in the near infrared region, values which are not satisfactory for solar energy collection and for many other applications where higher infrared reflectivity coupled with higher transmissions in the visible are required.

SUMMARY OF THE INVENTION

In one embodiment, the invention comprises transparent heat-mirrors formed from composite films. These films have a layer of metallic silver with a thickness of about 30–200 Å. A transparent, protective, anti-reflection layer is deposited on the outer surface of the silver layer to provide environmental protection as well as the desired optical properties to the film composite. A transparent, phase-matching, bonding layer is deposited on the other side of the silver layer which works in combination with the outer, anti-reflection coating to minimize reflection losses of solar radiation. It also serves as a nucleation and bonding layer.

One suitable embodiment of a transparent heat-mirror according to this invention can be formed by depositing 180 Å titanium dioxide coatings on each side of a 180 Å metallic silver layer. In this embodiment, the outer, anti-reflection layer and the phase-matching layer are identical, i.e., 180 Å titanium dioxide; nevertheless, this is not a requirement and these layers could be formed from different compounds and/or have different thicknesses.

Transparent heat-mirrors prepared according to this invention have significant advantages over those heretofor known. They are, for example, environmentally stable. Additionally, they can be manufactured using small quantities of readily available materials by adaptation of known techniques.

The most significant advantage is, of course, the outstanding optical properties which can be obtained. Metallic silver has a very high infrared reflectivity and the use of the disclosed anti-reflection and phase-matching layers serves to dramatically increase the solar transmission without concomitantly lowering infrared reflectivity.

DESCRIPTION OF PREFERRED EMBODIMENTS

As used herein, the following terms are defined to mean:

"Infrared radiation" means electromagnetic radiation having a wavelength above 0.8 micrometers;

"Visible radiation" means electromagnetic radiation having a wavelength of from about 0.4 to 0.8 micrometers;

"Transparent" means transparent to visible radiation unless otherwise stated;

"heat-mirror" means an element which has high reflectivity for infrared radiation; and, "Solar spectrum" means the range of wavelengths received from the sun, which will vary with many factors, of course, but does include visible radiation.

Figure 1:
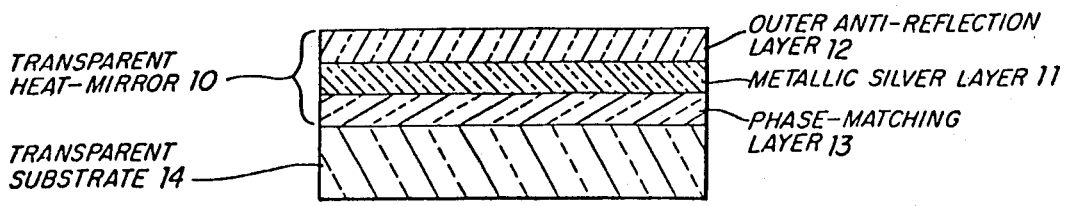
FIG. 1 illustrates schematically a transparent heat-mirror according to this invention.

Referring now to the Figures in more detail, the basic configuration of a transparent heat-mirror as described herein is illustrated in FIG. 1. Transparent heat-mirror 10 is formed from a metallic silver layer 11; a transparent, outer, protective, anti-reflection layer 12; and a transparent phase-matching layer 13. Because these layers are thin, a supporting transparent substrate 14, which may be glass, quartz, or transparent plastic, for example, is used. Outer layer 12 need not be the top layer in a composite, but it is always upper in the sense of being positioned on the side of the silver layer which has incident radiation thereon.

Known techniques can be used to deposit each of the layers in the composite films. It has been found, however, that it is necessary to deposit these layers so that they are discrete and continuous. In general, the layers should be deposited to minimize interdiffusion therebetween to provide discrete layers with very high infrared reflectivity and visible transmission. The exact method of deposition will depend upon parameters such as the various materials used for each of the layers, their thicknesses, the availability of equipment, etc. Some suitable techniques include RF sputtering, DC reactive sputtering, thermal evaporation, electron beam evaporation and chemical vapor deposition; those skilled in the art will know other suitable methods or will be able to ascertain them using no more than routine experimentation.

Metallic silver is used as the inner layer because of its outstanding optical properties for heat-mirrors. It offers high reflectivity to infrared radiation together with high transmission to solar radiation providing its reflection losses are minimized. Although high purity metallic silver films are preferred, certain impurities and/or alloying metals can be tolerated as long as they do not significantly reduce the infrared reflectivity or significantly increase the visible absorptivity.

Some of the advantages of silver, compared to other metals, have been documented. For example, it has been shown that both copper and gold absorb about 50% of the incident energy for wavelengths lower than 0.5 um, whereas silver does not absorb appreciably for wavelengths above 0.3 um. See Fan and Bachner, "Transparent Heat Mirrors for Solar Energy Applications," *Applied Optics*, 15, 1012 (April, 1976).

The exact thickness of the metallic silver layer will depend upon the specific application, but in general layers thinner than about 30 Å are difficult to deposit as continuous, discrete films, while layers thicker than about 200 Å are not suitable because of their lower solar transmission. The exact thickness, within this range, depends upon the specific application. For use in thermal power conversion, as is required in many solar energy applications, it has been calculated, for example, that the preferred silver layer thickness is from about 150 Å to about 200 Å. Somewhat thinner layers, such as down to about 50 Å, are believed to be more suitable for domestic, insulating windows. Solar energy panels which provide heat for space heating or hot water heating are believed to require silver layers from about 100 Å to about 150 Å. Transparent windows for ovens and furnaces will have silver layers with thicknesses maximized for the appropriate temperatures in the ovens or furnaces, but in general, these layers will be within the 30–200 Å range.

Suitable materials for the outer protective coating are materials which are transparent to solar and infrared radiation in the thicknesses used, are themselves environmentally stable, are capable of serving as protective layers to protect the silver layer from adverse environmental elements. Environmental stability means that the properties of these materials, including the optical properties, do not appreciably deteriorate upon exposure to air, water and temperatures up to 200° C. Additionally, these materials serve as anti-reflection coatings to minimize the reflection of visible light by the silver layer, and these materials preferably have high indices of refraction, such as above 1.4.

Some suitable materials for the outer anti-reflection layers include, but are not limited to, titanium dioxide, silicon dioxide, silicon monoxide, bismuth oxide, tin oxide, indium oxide, chromium oxide, zinc sulfide and magnesium fluoride. Other suitable materials are known to those skilled in the art, or are ascertainable by no more than routine experimentation. Titanium dioxide is a preferred material because of its high refractive index and because it has been found to have minimum interdiffusion with silver, even at elevated temperatures such as 200° C., if care is taken to deposit discrete layers.

Suitable materials for the phase-matching layer are transparent materials which cooperate with the outer anti-reflection coating to minimize visible light reflection losses by the silver layer. The transparent materials suitable for the outer, anti-reflection layer are also suitable for the phase-matching layer, and titanium dioxide is also a preferred material for this layer. An additional requirement is that films prepared be adherent to transparent substrates, such as glass, quartz, plastic, etc. It is particularly preferred to have materials which offer better adherence to such substrates than silver, but to which silver adheres well, and which serve as nucleation layers for silver. The phase-matching layer can be formed from the same material as the outer anti-reflecting layer, or from a different material in which case it would probably have a different thickness. As mentioned above, the primary purpose of the phase-matching layer is to cooperate with the anti-reflection coating to increase the transmission of visible or solar radiation through the entire composite film.

The thicknesses for the outer, anti-reflection layer and the phase-matching layer are chosen to maximize solar transmission and infrared reflectivity. It should be noted that the thickness of the anti-reflection layer is not chosen by using quarter-wave theory. It has been found that a thickness of from about 150 Å to about 500 Å is suitable for the outer, protective coating. The thickness of the phase-matching layer is then chosen based upon a number of considerations such as whether it is desired to achieve the optimum solar transmission, the optimum ratio of transmission to thermal reflectivity or some combination between these optimized values.

Two criteria have been established to help in selecting the specific thicknesses for the outer protective layer and the phase-matching layers.

These criteria involve two heat-mirror parameters which are defined as:

$$\text{Effective Solar Absorptivity } (\alpha_{eff}) = \frac{\int_{0.25\ \mu m}^{2.5\ \mu m} Tr(\lambda)A(\lambda)d\lambda}{\int_{0.25\ \mu m}^{2.5\ \mu m} A(\lambda)d\lambda}$$

$$\text{Effective Infrared Emissivity } (\epsilon_{eff}) = \frac{\int_{1.0\ \mu m}^{100\ \mu m} [1 - R(\lambda)]W_B(T_B,\lambda)d\lambda}{\int_{1.0\ \mu m}^{100\ \mu m} W_B(T_B,\lambda)d\lambda}$$

where $TR(\lambda)$ = Transmission of heat-mirror at wavelength $\lambda$
$R(\lambda)$ = Reflectivity of heat-mirror at wavelength $\lambda$
$A(\lambda)$ = Solar energy spectrum
$W_B(T_B,\lambda)$ = Energy distribution for a blackbody at an operating temperature $T_B$.

These definitions assume that the heat-mirror is used in conjunction with a perfect (i.e., black) absorber, which absorbs all the solar radiation transmitted and also all the infrared radiation reflected by the heat-mirror.

These definitions facilitate comparison with the known quantities, $\alpha$ and $\epsilon$, which are used to characterize selective absorbers. It can also be seen from these definitions, that $\alpha_{eff}$ is the effective transmission obtained by integrating over the spectrum from 0.25 μm to 2.5 μm. Similarly, $\epsilon_{eff}$ is the effective reflectivity heat loss (1−r) obtained by integrating over the spectrum from 1.0 μm to 100 μm. These values allow heat-mirror properties to be evaluated quantitatively as a function of the outer and phase-matching layer thicknesses for any chosen operating temperature. Typically, the computations required for such evaluations are performed with the aid of a computer.

Transparent heat-mirrors, according to this invention, must have outer protective and phase-matching layers which provide, in combination with the silver layer, an $\alpha_{eff}$ of at least about 0.5 and an $\alpha_{eff}/\epsilon_{eff}$ of at least about 5. Preferably $\alpha_{eff}$ is above about 0.8 and $\alpha_{eff}/\epsilon_{eff}$ is above about 10.

In most cases, the optical properties desired can be achieved by choosing a phase-matching layer of between about 150 Å and about 500 Å. Typically, the preferred thickness for the phase-matching layer is within about 10% of the thickness of the anti-reflection coating.

Transparent heat-mirrors according to this invention have three critical layers. These are the silver layer, an outer protective layer, and a phase-matching layer. It should be recognized that additional layers can be present if desired. The preferred embodiments, however, have only three layers (disregarding the substrate), and particularly preferred embodiments have a single silver film sandwiched between single titanium dioxide films on either side thereof.

Transparent heat-mirrors as described herein are useful for a number of applications. They are, for example, useful in the collection and trapping of solar energy. They can also be used for transparent, insulation for buildings, furnaces, etc. In many of these uses, it is only the "visible" part of the solar spectrum that is of concern. Nevertheless, the heat-mirrors, as defined herein, are useful for such applications. Other uses will be apparent to those skilled in the art wherein it is desired to have materials which have high infrared reflectivity and high solar or visible transmission.

The invention can be further understood by referring to the following examples.

EXAMPLE 1

Preparation of a Transparent Heat-Mirror

A transparent heat-mirror was prepared by RF sputtering a titanium dioxide/silver/titanium dioxide multilayer film onto Corning No. 7059 glass. The RF sputtering system used was a $LN_2$-trapped, turbopumped unit (base pressure approximately $5 \times 10^{-7}$ Torr) with a Materials Research Corporation three-target turret head sputtering module. The targets were commercially prepared five inch diameter discs of silver and titanium dioxide. A multilayered film was grown on a glass substrate resting on a water-cooled stainless steel platform in a single pumpdown with the following sequence.

The titanium dioxide target was presputtered at 1.6 watt/cm$^2$ in an argon-oxygen mixture (10 volume percent oxygen) for 15 minutes, followed by 15 minutes of presputtering in argon gas only. The flow rate of argon-oxygen and argon was kept at 74 cc/min. and the sputtering pressure was maintained between $7-10 \times 10^{-3}$ Torr.

The titanium dioxide film was then sputtered at 0.8 watt/cm$^2$ onto the glass substrate for 7½ minutes in argon at a 74 cc/min flow rate and pressure of $7-10 \times 10^{-3}$ Torr. The thickness of the titanium dioxide coating produced was approximately 180 Å.

Metallic silver was then deposited over the titanium dioxide film by sputtering for 35 seconds at 0.4 watt/cm$^2$ in argon at 74 cc/min and a pressure of $7-10 \times 10^{-3}$ Torr. This produced a metallic silver layer approximately 180 Å thick.

An outer layer of titanium dioxide was then deposited at 0.8 watt/cm$^2$ for 7½ minutes in argon gas at 74 cc/min and a pressure of $7-10 \times 10^{-3}$ Torr. This titanium dioxide layer also had a thickness of about 180 Å.

The transmission to visible light and reflectivity of infrared light were tested using conventional spectrophotometric techniques which had an accuracy of ±1%. The data obtained are plotted in FIG. 2 from which it can be seen that the transparent heat-mirror of this Example had an infrared reflectivity of about 98-99% at 10 micrometers and a transmission of about 84% at 0.5 micrometers.

Figure 3:
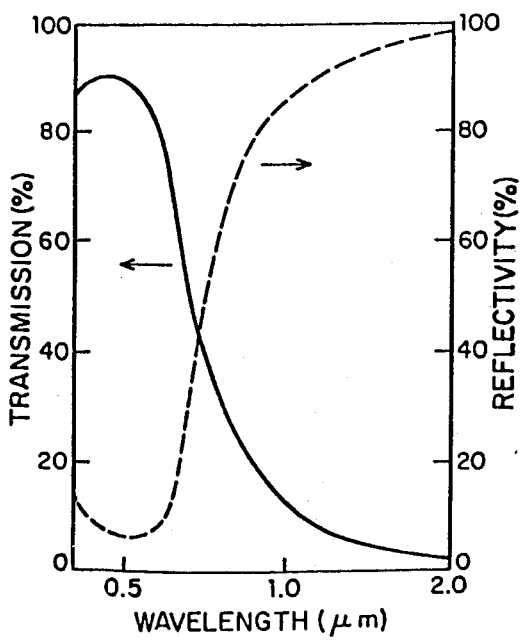
FIG. 3 illustrates graphically the computed theoretical reflectivity and transmission of a transparent heat-mirror formed from a metallic silver layer sandwiched between titanium dioxide layers and placed on a one millimeter thick substrate of Corning No. 7059 glass; and, FIG. 4 illustrates graphically the measured variation of optical transmission with angle of incidence.

Theoretical curves for the reflectivity of infrared light and transmissipn of visible light for a titanium dioxide/silver/titanium dioxide heat-mirror are shown in FIG. 3. These were generated by a computer and are based on multilayer matrix formulation. See Heaven, O. S., "Optical Properties of Thin Solid Films," Dover Publications, p. 69 (1965). Published optical constants for titanium dioxide and silver were used. See Moses, A. J., "Optical Materials Properties," IFI/Plenun Data Corp., p. 97 (1971); and Johnson, P. B. and Christy, R. W., Phys. Rev., B6, 4370 (1972).

Figure 2:
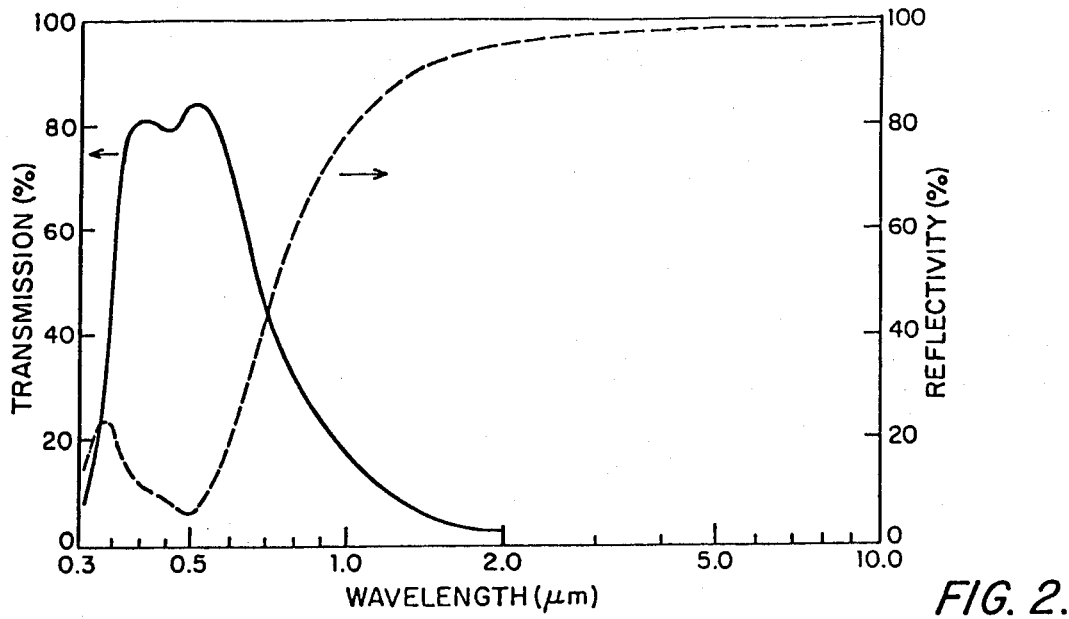
FIG. 2 illustrates graphically the actual measured reflectivity and transmission of a transparent heat-mirror formed from a 180 Å metallic silver layer sandwiched between 180 Å titanium dioxide layers and placed on a one millimeter thick substrate of Corning No. 7059 glass.

It can be seen by comparing FIGS. 2 and 3 that the actual measured values are close to the theoretically predicted. This is evidence that the layers are discrete and that interdiffusion has been minimized.

EXAMPLE 2

Effect of Angle of Incidence

Figure 4:
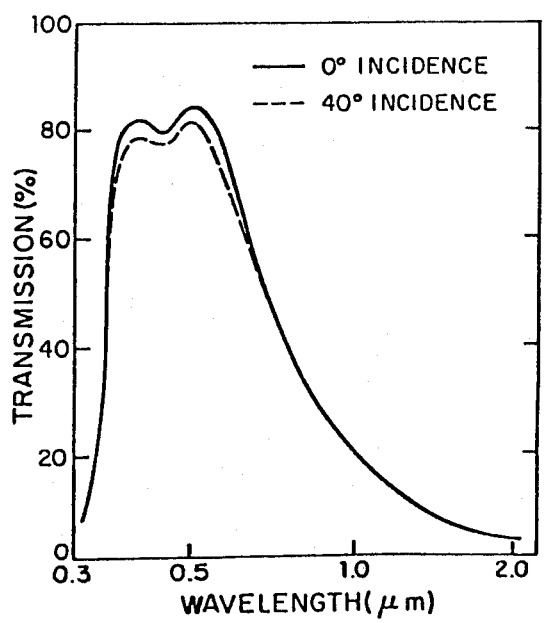

The effect of angle of incidence on optical transmission of the heat-mirror prepared in Example 1 was tested on a conventional spectrophotometer having accuracy to ±1%. No appreciable differences were noted between 0° and 20°. The results for 0° and 40° are plotted in FIG. 4 from which it can be seen that the differences are minimal.

EXAMPLE 3

Environmental Stability—Elevated Temperatures

The environmental stability of the transparent heat-mirror prepared in Example 1 was tested by maintaining it in air at 200° C. for 48 hours. No appreciable degradation in its optical properties were seen. Maintaining the composite at 300° C. for 16 hours produced only small changes in the optical properties.

EXAMPLE 4

Environmental Stability—Water

The environmental stability of the composite prepared in Example 1 was further tested by running tap water across the surface of the composite for 5 to 10 minutes. The composite was then examined under an optical microscope using a bright field and no changes were noted. Upon measuring the transmission of visible light and reflectivity to infrared light no significant changes were noted.

EXAMPLE 5

Auger Profile

The transparent heat-mirror of Example 1 was characterized by Auger profile spectroscopy using a Physical Electronics Laboratory Inc. Auger spectrometer. The data obtained indicated that each layer of the composite film was discrete.

EXAMPLE 6

Heat-Mirrors Optimized for Various Conditions

Optimum thicknesses for outer protective layers ($t_o$) and phase-matching layers ($t_{pm}$) were calculated using a computer for various conditions and for two different materials. These conditions were:

Case 1—For equal layers, maximum $\alpha_{eff}/\epsilon_{eff}$ ratio;
Case 2—For equal layers, maximum $\alpha_{eff}$;
Case 3—Maximum $\alpha_{eff}/\epsilon_{eff}$ ratio;
Case 4—Maximum $\alpha_{eff}$.

These values were computed for outer protective and phasematching layers formed from both titanium dioxide and zinc sulfide. Air mass 2 and an operating temperature of 121° C. were used in these calculations. The results are presented in Tables I and II, with a correction having been made to eliminate the effect of the glass (SiO$_2$) substrate.

TABLE I

| $t_{Ag}$(Å) | $\alpha_{eff}$ | $\epsilon_{eff}$ | $\alpha_{eff}/\epsilon_{eff}$ | $t_o, t_{pm}$(Å) |
|---|---|---|---|---|
| | | Case 1 | | |
| 30 | .869 | .126 | 6.9 | 377 |
| 50 | .905 | .0635 | 14.3 | 359 |
| 100 | .876 | .0260 | 33.7 | 359 |
| 150 | .746 | .0149 | 46.9 | 337 |
| 200 | .613 | .0114 | 53.8 | 310 |
| 250 | .487 | .0089 | 54.7 | 290 |
| 300 | .374 | .0074 | 50.5 | 268 |
| 400 | .209 | .0058 | 36.0 | 230 |
| 500 | .110 | .0051 | 21.6 | 212 |
| | | Case 2 | | |
| 30 | .870 | .126 | 6.9 | 389 |
| 50 | .906 | .0636 | 14.2 | 372 |
| 100 | .877 | .0261 | 33.6 | 364 |
| 150 | .746 | .0159 | 46.9 | 342 |
| 200 | .613 | .0114 | 53.8 | 314 |
| 250 | .487 | .0089 | 54.7 | 293 |
| 300 | .374 | .0074 | 50.5 | 272 |
| 400 | .206 | .0058 | 35.5 | 231 |
| 500 | .110 | .0051 | 21.6 | 214 |

| $t_{Ag}$(Å) | $\alpha_{eff}$ | $\epsilon_{eff}$ | $\alpha_{eff}/\epsilon_{eff}$ | $t_o$(Å) | $t_{pm}$(Å) |
|---|---|---|---|---|---|
| | | | Case 3 | | |
| 30 | .868 | .126 | 6.9 | 359 | 392 |
| 50 | .905 | .0635 | 14.3 | 352 | 372 |
| 100 | .876 | .0260 | 33.7 | 357 | 361 |
| 150 | .747 | .0159 | 47.0 | 345 | 324 |
| 200 | .615 | .0114 | 53.9 | 320 | 295 |
| 250 | .489 | .0089 | 54.9 | 302 | 275 |
| 300 | .376 | .0074 | 50.8 | 278 | 251 |
| 400 | .211 | .0058 | 36.4 | 241 | 220 |
| 500 | .110 | .0051 | 21.6 | 221 | 207 |
| | | | Case 4 | | |
| 30 | .870 | .126 | 6.9 | 385 | 394 |
| 50 | .906 | .0636 | 14.2 | 373 | 370 |
| 100 | .877 | .0261 | 33.6 | 367 | 360 |
| 150 | .747 | .0159 | 47.0 | 353 | 324 |
| 200 | .615 | .0114 | 53.9 | 328 | 296 |
| 250 | .489 | .0089 | 54.9 | 306 | 274 |
| 300 | .376 | .0074 | 50.8 | 286 | 255 |
| 400 | .211 | .0058 | 36.4 | 247 | 221 |
| 500 | .110 | .0051 | 21.6 | 224 | 208 |

TABLE II

ZnS/Ag/ZnS

| $t_{Ag}$(Å) | $\alpha_{eff}$ | $\epsilon_{eff}$ | $\alpha_{eff}/\epsilon_{eff}$ | $t_o, t_{pm}$(Å) |
|---|---|---|---|---|
| | | Case 1 | | |
| 30 | .907 | .123 | 7.4 | 404 |
| 50 | .933 | .0623 | 15.0 | 412 |
| 100 | .858 | .0255 | 33.6 | 432 |
| 150 | .666 | .0156 | 42.7 | 453 |
| 200 | .553 | .0112 | 49.4 | 379 |
| 300 | .311 | .0073 | 42.6 | 343 |
| 400 | .161 | .0057 | 28.2 | 295 |
| 500 | .081 | .0050 | 16.2 | 268 |
| | | Case 2 | | |
| 30 | .911 | .124 | 7.3 | 438 |
| 50 | .934 | .0623 | 15.0 | 424 |
| 100 | .858 | .0255 | 33.6 | 436 |
| 150 | .701 | .0156 | 44.9 | 411 |
| 200 | .553 | .0112 | 49.4 | 383 |

TABLE II-continued

ZnS/Ag/ZnS

| 300 | .311 | .0073 | 42.6 | 347 |
| 400 | .161 | .0057 | 28.2 | 297 |
| 500 | .081 | .0050 | 16.2 | 269 |

| $t_{Ag}$(Å) | $\alpha_{eff}$ | $\epsilon_{eff}$ | $\alpha_{eff}/\epsilon_{eff}$ | $t_o$(Å) | $t_{pm}$(Å) |
|---|---|---|---|---|---|
| *Case 3* | | | | | |
| 30 | .907 | .123 | 7.4 | 394 | 417 |
| 50 | .933 | .0623 | 15.0 | 410 | 415 |
| 100 | .858 | .0255 | 33.6 | 429 | 432 |
| 150 | .702 | .0156 | 45.0 | 418 | 383 |
| 200 | .555 | .0112 | 49.6 | 393 | 354 |
| 300 | .313 | .0073 | 42.9 | 360 | 313 |
| 400 | .162 | .0057 | 28.4 | 320 | 275 |
| 500 | .081 | .0050 | 16.2 | 286 | |
| *Case 4* | | | | | |
| 30 | .911 | .124 | 7.3 | 432 | 446 |
| 50 | .934 | .0623 | 15.0 | 427 | 475 |
| 100 | .858 | .0256 | 33.5 | 437 | 432 |
| 150 | .702 | .0156 | 45.0 | 420 | 387 |
| 200 | .555 | .0112 | 49.6 | 398 | 354 |
| 300 | .313 | .0073 | 42.9 | 362 | 312 |
| 400 | .162 | .0057 | 28.4 | 324 | 275 |
| 500 | .081 | .0050 | 16.2 | 288 | 259 |

EXAMPLE 7

Heat-Mirrors Having Outer Protective and Phase-Matching Layers Arbitrarily Chosen Values for $\alpha_{eff}$ and $\epsilon_{eff}$ were computed for heat-mirrors containing silver sandwiched between titanium dioxide and silver sandwiched between zinc sulfide with outer protective and phase-matching layers arbitrarily chosen to each have thicknesses of 500, 1000 and 1500 Å. A correction was made to eliminate the effect of a glass ($SiO_2$) substrate. Air mass 2 conditions and operating temperature of 121° C. were selected. The results are presented in Tables III and IV. It is readily apparent from the data obtained that using these thicknesses, which are typical of thicknesses which might be chosen using quarterwave theory, does not produce optimum results.

TABLE III

$TiO_2/Ag/TiO_2/SiO_2$

| $t_{Ag}$(Å) | $t_o, t_{pm}$(Å) | $\alpha_{eff}$ | $\epsilon_{eff}$ | $\alpha_{eff}/\epsilon_{eff}$ |
|---|---|---|---|---|
| 100 | 500 | .806 | .0266 | 30.3 |
|  | 1000 | .674 | .0299 | 22.5 |
| 200 | 500 | .524 | .0118 | 44.4 |
|  | 1000 | .419 | .0138 | 30.4 |
|  | 1500 | .361 | .018 | 20.6 |
| 300 | 500 | .277 | .00776 | 35.7 |
|  | 1000 | .237 | .00952 | 24.1 |
|  | 1500 | .200 | .0133 | 15.0 |
| 400 | 500 | .132 | .0061 | 21.6 |
|  | 1000 | .127 | .0078 | 16.3 |
|  | 1500 | .1019 | .0115 | 8.9 |
| 500 | 500 | .0600 | .0054 | 11.1 |
|  | 1000 | .0647 | .0071 | 9.1 |
|  | 1500 | .0493 | .0107 | 4.6 |

TABLE IV

ZnS/Ag/ZnS

| $t_{Ag}$(Å) | $t_o, t_{pm}$(Å) | $\alpha_{eff}$ | $\epsilon_{eff}$ | $\alpha_{eff}/\epsilon_{eff}$ |
|---|---|---|---|---|
| 100 | 500 | .845 | .0256 | 33.0 |
|  | 1000 | .645 | .0265 | 24.3 |
|  | 1500 | .5596 | .0279 | 20.1 |
| 200 | 500 | .521 | .0112 | 46.5 |
|  | 1000 | .368 | .0115 | 32. |
|  | 1500 | .328 | .0120 | 27.3 |
| 300 | 500 | .276 | .00735 | 37.6 |
|  | 1000 | .187 | .00751 | 24.9 |
|  | 1500 | .173 | .00777 | 22.3 |

EXAMPLE 8

Effect of Phase-Matching Layer

The transmission (T) at 0.5 μm and reflectivity at 5.0 μm were calculated for: (1) a silver film 180 Å thick coated on one side only with a titanium dioxide layer 180 Å thick; and (2) the same silver film coated on both sides with titanium dioxide layers 180 Å thick. The values found were:

|  | T(0.5 μm) | R(05.0 μm) |
|---|---|---|
| 180 Å $TiO_2$/180 Å Ag | 76% | 98% |
| 180 Å $TiO_2$/180 Å Ag/180 Å $TiO_2$ | 89% | 98% |

A significant increase in visible light transmission can be seen when the phase-matching layer is present.

What is claimed is:

1. A composite film comprising a continuous, discrete, silver layer sandwiched between two continuous and discrete layers of titanium dioxide each having a thickness of greater than about 150 Å, said silver and titanium dioxide layers having thicknesses that cooperate to provide said composite film with significantly higher solar energy transmission compared to said silver layer alone and having high infrared reflectivity.

2. A composite film of claim 1 wherein each of said titanium dioxide layers has a thickness within the range of from about 150 Å to about 500 Å.

3. The composite film of claim 1 or 2 wherein said silver layer has a thickness within the range of from about 30 Å to about 200 Å.

* * * * *